J. N. ALSOP.
METHOD OF TREATING ORGANIC AND INORGANIC SUBSTANCES.
APPLICATION FILED NOV. 25, 1919.
1,402,203.
Patented Jan. 3, 1922.
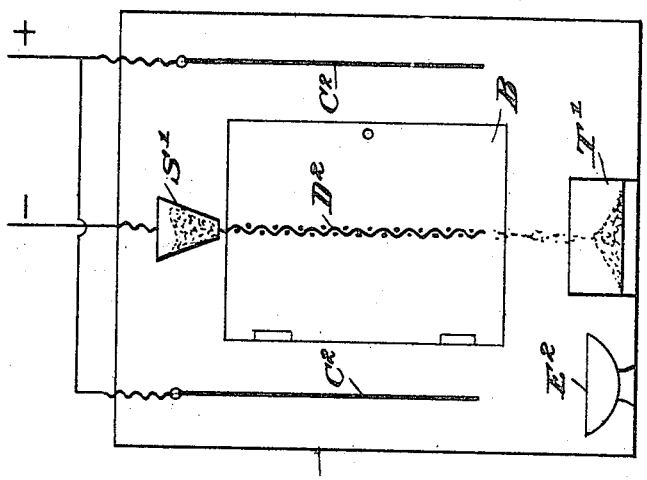
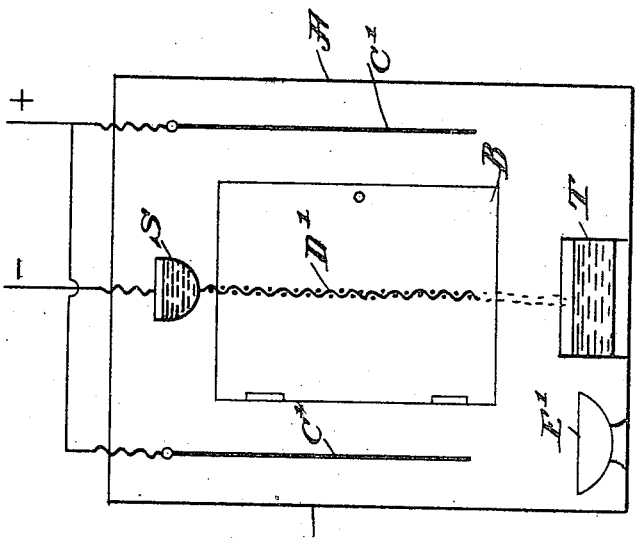
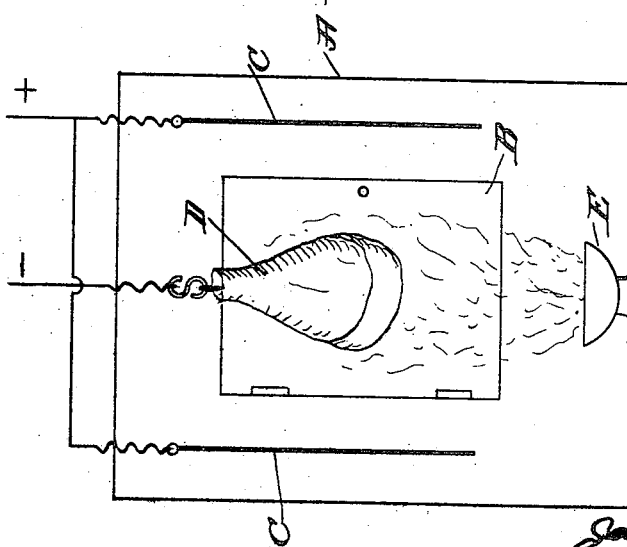
Inventor:
James N. Alsop

UNITED STATES PATENT OFFICE.

JAMES N. ALSOP, OF OWENSBORO, KENTUCKY, ASSIGNOR TO PACKERS MEAT SMOKING CORPORATION, OF CHICAGO, ILLINOIS, A CORPORATION OF DELAWARE.

METHOD OF TREATING ORGANIC AND INORGANIC SUBSTANCES.

1,402,203.     Specification of Letters Patent.     Patented Jan. 3, 1922.

Application filed November 25, 1919. Serial No. 340,511.

*To all whom it may concern:*

Be it known that I, JAMES N. ALSOP, a citizen of the United States, residing at Owensboro, in the county of Daviess and State of Kentucky, have invented new and useful Improvements in Methods of Treating Organic and Inorganic Substances, of which the following is a specification.

The present invention relates to a method of treating substances, both organic and inorganic, for the purpose of imparting to those substances certain desirable characteristics, and as herein disclosed will be described in connection with the treating of an organic substance, such as, for example, meats, although it will be understood that the method is not limited to the specific illustration herein set forth.

I have discovered that substances to which certain desirable characteristics, such as flavor, odor, color, and like physical qualities are to be imparted, can be successfully treated by my method in a much shorter space of time, with a much less elaborate apparatus, and with far better results, when the substances to which these qualities are to be imparted are electrified, and in such electrified condition subjected to the treatment by the media whose qualities are to be imparted to the substances or the action which effects the changed and desirable conditions of the substances under treatment.

The simple illustration which is herein described is that of treating meats, the substance used as an example here is pig meat, and the treatment used to illustrate the invention is the operation of smoking pig meat; but, as stated, this is simply one application of my invention and is not to be regarded as restrictive of its use.

In order that the invention may be more clearly understood by those skilled in the art, I have shown, conventionally, apparatus for practicing the invention, this showing being diagrammatic for the reason that, as will be obvious, the mechanical devices for carrying the invention into effect may be widely varied.

In the drawings:—

Figure 1 is a diagrammatic view to illustrate conventionally apparatus for practicing my invention in connection with the curing of meats.

Figure 2 is a similar view illustrating the invention as applied to the treatment of liquids.

Figure 3 is a view illustrating the treatment of pulverized material.

In the drawings, referring particularly to Figure 1, A indicates any suitable closed container or receptacle of such dimensions and mechanical makeup as is suited to the particular needs of the situation having regard for the character or quantity of material under treatment, the present illustration showing the rectangular box-like container A which may have any suitable means of access to the interior thereof, as for example, the door B, although the mechanical makeup of this container may, of course, be widely varied.

Within the container A is disposed an anode which, as herein shown, is made up of plates C, of any suitable material, to form the positive terminal of an electric source, which electric source may be a static machine (not shown) or an induction coil (not shown), the result aimed at being simply to impose a current either direct or alternating, but preferably unidirectional on the anode C of the apparatus.

In my experimental work I have used, and successfully cured pig meat of standard size in hams and side meat, a pulsating, unidirectional current of a voltage sufficient to produce, in air, a spark of substantially eight (8) inches in length.

Within the range of electrical activity of the anode C, I suspend or otherwise dispose the substance D to be treated, this being conventionally shown in the present instance as a piece of meat, which, through a suitable conducting support, is electrically connected with the negative side of the circuit, forming the cathode or negative terminal of such circuit. In the illustration here shown the cathode D is disposed between the plates C forming the anode of the circuit, although the arrangement and relation of anode and cathode may, of course, be varied within wide range to meet the needs of the particular work being done.

With this arrangement, when a static or induced charge occurs, there will be electrification of the substance D which forms the cathode of the circuit.

I have discovered that in this electrified condition, substances are more highly susceptible to the action of the agents with which it is desirable to treat them, so that after treatment for a comparatively short time, and without the objections which exist to present methods of imposing these agents on such substances, a highly superior product is obtained.

In the present example, which is used as an illustration, I have discovered that when meat is electrified as herein described, it will cure under the action of gaseous agents, such as, for example, smoke, more quickly and in a more thorough and uniform manner in a much shorter space of time. In the illustration of the invention herein shown, which is meat curing, I effect this application of the curing agent by introducing, in any suitable manner, such curing agent into the receptacle A while maintaining the substance D to be cured in an electrified condition. I have conventionally shown in the drawings a brazier E at the bottom of the receptacle in which any suitable gas or smoke producing material may be burned in such a manner as to produce the necessary volume of smoke, which will rise and envelop the substance D under treatment.

I have demonstrated conclusively by the use of apparatus constructed in accordance with this disclosure, that following this method as set forth, meat, when treated, in the electrified condition to which it is brought, has imposed upon it and throughout its tissues by the action of the electric field or flux, in a very intimate and rapid manner the qualities and characteristics of the curing agent, in the particular example, the qualities derived from the smoke generated by the combustion of the material in the brazier E.

The practical advantages of the method in connection with all substances susceptible of treatment according to this method, is, as I have determined in applying the invention to the treatment of meats, that the process of treating may be completed in a much shorter time than by any of the methods now known to me and as distinguished from some of the methods now in use which seek to reduce the length of time within which meats may be cured. Furthermore, the curing action is accomplished with a minimum loss of weight of the substance under treatment, due, not only to the relatively short period of time in which the substance is subjected to treatment, but also to the fact that the temperature of the substance is not appreciably raised during its treatment.

In Figure 2, I have shown an apparatus similar to that shown in Figure 1, but adapted for the treatment of liquids, which it may be desirable either to age, cure, color, condition, flavor, or generally improve. In Figure 2, the anode C' is arranged as before, the cathode D' being in the form of a plate or fabric of suitable material, so disposed as to receive drip of the liquid under treatment from any suitable supply as S, and over which the liquid will flow in a film from the supply S down the cathode D' and be subjected to the electrical flux in the same manner as the solid substance shown in Figure 1. The liquid under treatment may, if desired, have imposed on it any suitable gas or vapor to age, cure, condition, color, flavor, or improve it, which may be generated in a brazier E' or introduced in any other suitable way if it is desired to impose such gaseous agent on the liquid under treatment, a suitable receiving and conducting trough T being provided to receive the liquid as it flows from the cathode D'.

It is obvious, of course, that the plate or fabric D' can be dispensed with and the liquid allowed to fall in a thin film or sheet or in any other suitable manner, from the supply S so that the liquid itself will form the cathode element of the apparatus and be electrified.

Oils may be cured and rectified so as to eliminate unpleasant characteristics or have imposed on them by suitable agents, including gases or vapors, any qualities which tend to improve them; liquors may be aged or have imparted to them any desirable qualities derivable from imposing upon them conditioning agents having the necessary characteristics which it is desirable to impart to such liquors; and waters may be perfumed by treating them in the presence of the agents necessary to impart the proper odors to such waters.

In Figure 3, apparatus similar to those described above and shown in Figures 1 and 2, in which pulverized vegetable, animal, and mineral substances may be treated, this apparatus having the anode $C^2$ and the cathode $D^2$ formed as a plate or fabric over which the pulverized material falling from the supply S' flows, a suitable trough T' being provided to receive the descending material.

The plate or fabric $D^2$ may, of course, be dispensed with, as described in connection with the treatment of liquids, and the pulverized material permitted to fall in a sheet from the supply S' so as to itself constitute the cathode and be electrified.

As stated at the outset, my illustration is diagrammatic and conventional, and the examples which I have given of substances and materials to be treated are merely to illustrate the application of the method and in no sense restrictive, since it is obvious that materials and substances which may be treated by this process with advantageous results are many, and I do not limit my invention to any specific arrangement of apparatus or to the treatment of any particular substances, organic or inorganic.

I am unable to explain the principle or theory underlying my development as it is, at the present time, obscure; but actual use of the invention, following the disclosure here given, has demonstrated that the results specified are secured.

I claim:

1. The method of curing meat, which consists in electrically connecting the meat with the negative side of an electric circuit and, while in its electrified condition, subjecting the meat to the action of a gaseous treating agent.

2. The method of treating substances which consists in constituting such substance the terminal of an electrical circuit, passing a current of electricity through such circuit and electrifying such substance, and subjecting the substance in electrified condition to the action of a gaseous treating agent.

3. The method of treating substances which consists in constituting such substance the negative terminal of an electrical circuit, passing a current of electricity through such circuit and electrifying such substance, and subjecting the substance in electrified condition to the action of a gaseous treating agent.

4. The method of treating meat which consists in electrifying the meat, and while in such electrified condition subjecting the meat to the action of a gaseous treating agent.

5. The method of treating animal substances, which consists in placing the substance in circuit with the negative terminal of an electrical circuit, imposing a current on such circuit to electrify such substance, and while in such electrified condition subjecting the substance to the action of a gaseous agent.

6. The method of curing meat, which consists in so disposing the meat as to form the terminal of an electric circuit, imposing a current of electricity on such circuit to electrify the meat, and while in such electrified condition subjecting the meat to the curing action of a suitable gaseous treating agent, said agent becoming a part of said circuit.

7. The method of curing meat, which consists in so disposing the meat as to form the negative terminal of an electric circuit, imposing a current of electricity on such circuit to electrify the meat, and while in such electrified condition subjecting the meat to the curing action of a suitable gaseous treating agent.

8. The method of treating meat which consists in providing an electrical circuit, imposing a current of electricity on such circuit, contacting the meat with the negative side of the circuit to electrify it, and while in such electrified condition, subjecting the meat to the action of a gaseous treating agent.

9. The method of treating substances which consists in providing an electrical circuit, imposing a current of electricity on such circuit, contacting the material to be treated with the negative side of such circuit to electrify it, and while in such electrified condition, subjecting the material to the action of a gaseous treating agent.

In testimony whereof I have hereunto set my hand.

JAMES N. ALSOP.